United States Patent
Sato et al.

(10) Patent No.: US 12,130,408 B2
(45) Date of Patent: Oct. 29, 2024

(54) ANTI-GLARE FILM; ANTI-GLARE ARTICLE, TOUCHSCREEN, AND DISPLAY DEVICE USING SAME; AND METHOD FOR SELECTING ANTI-GLARE FILM

(71) Applicant: DAI NIPPON PRINTING CO., LTD., Tokyo (JP)

(72) Inventors: Masaharu Sato, Higashihiroshima (JP); Takayuki Fukuda, Okayama (JP); Gen Furui, Okayama (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 512 days.

(21) Appl. No.: 17/615,412

(22) PCT Filed: May 26, 2020

(86) PCT No.: PCT/JP2020/020740
§ 371 (c)(1),
(2) Date: Dec. 28, 2021

(87) PCT Pub. No.: WO2020/246314
PCT Pub. Date: Dec. 10, 2020

(65) Prior Publication Data
US 2022/0229208 A1 Jul. 21, 2022

(30) Foreign Application Priority Data
Jun. 7, 2019 (JP) .................. 2019-107214

(51) Int. Cl.
*G02B 1/11* (2015.01)
*G02F 1/1335* (2006.01)
*G06F 3/041* (2006.01)

(52) U.S. Cl.
CPC .......... *G02B 1/11* (2013.01); *G02F 1/133502* (2013.01); *G06F 3/041* (2013.01)

(58) Field of Classification Search
CPC ...... G02B 1/11; G02F 1/133502; G06F 3/041
(Continued)

(56) References Cited

FOREIGN PATENT DOCUMENTS

| JP | 2014-048345 | 3/2014 |
| JP | 2018-189975 | 11/2018 |

(Continued)

OTHER PUBLICATIONS

Translation of 2013031766 (Year: 2024).*
International Search Report of PCT/JP2020/020740, Aug. 25, 2020, 5 pages including English translation.

*Primary Examiner* — Jerry L Brooks
(74) *Attorney, Agent, or Firm* — HSML P.C.

(57) ABSTRACT

Provided is an anti-glare film that can suppress glare in various display devices with different distances between the display elements and the anti-glare layer. The anti-glare film includes an anti-glare layer, wherein the anti-glare layer has a 500-μm square area, as measured for surface roughness, satisfying condition 1 and condition 2 below, where the maximum peak height is defined as P, a plane having a height obtained by adding P/6 to the average height is defined as the first reference plane, the number of projections exceeding the first reference plane is defined as N1, a plane having a height obtained by adding P/3 to the average height is defined as the second reference plane, and the number of projections exceeding the second reference plane is defined as N2:

$P$ is 0.20 μm or more and 1.20 μm or less; and <condition 1>

$0.20 \leq N2/N1 \leq 0.45$. <condition 2>.

10 Claims, 2 Drawing Sheets

(58) Field of Classification Search
USPC .......................................................... 359/601
See application file for complete search history.

(56) References Cited

FOREIGN PATENT DOCUMENTS

| | | | |
|---|---|---|---|
| JP | 2019-020728 | 2/2019 | |
| WO | 2010/113827 | 10/2010 | |
| WO | 2013/015039 | 1/2013 | |
| WO | WO-2013031766 A1 * | 3/2013 | ............. G02B 5/021 |
| WO | 2016-035574 | 3/2016 | |
| WO | 2016/136871 | 9/2016 | |
| WO | 2019/065865 | 4/2019 | |

* cited by examiner

[Fig. 1]
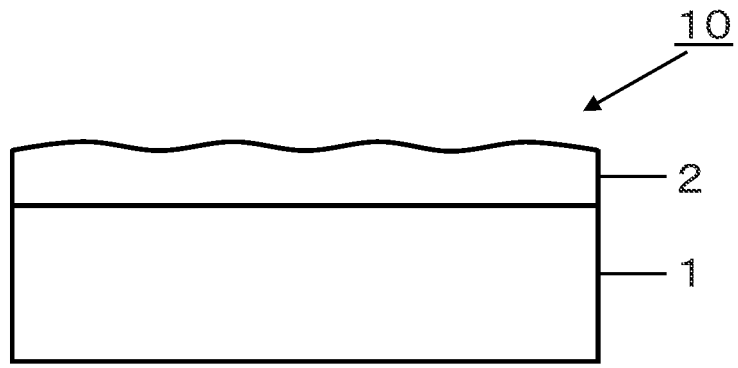
[Fig. 2]
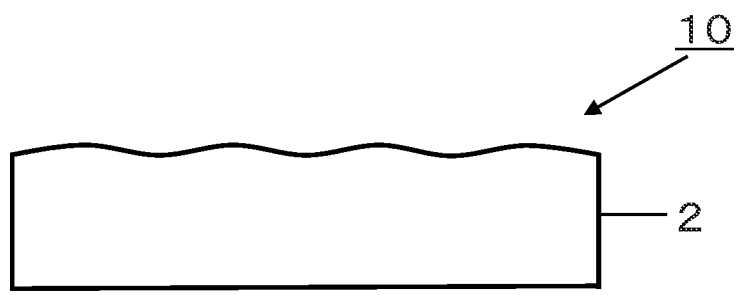
[Fig. 3(a)]
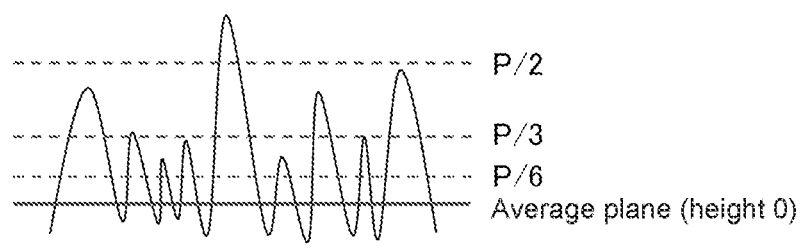
[Fig. 3(b)]
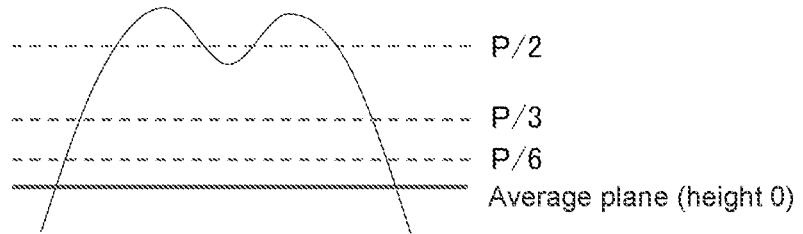

[Fig. 4]
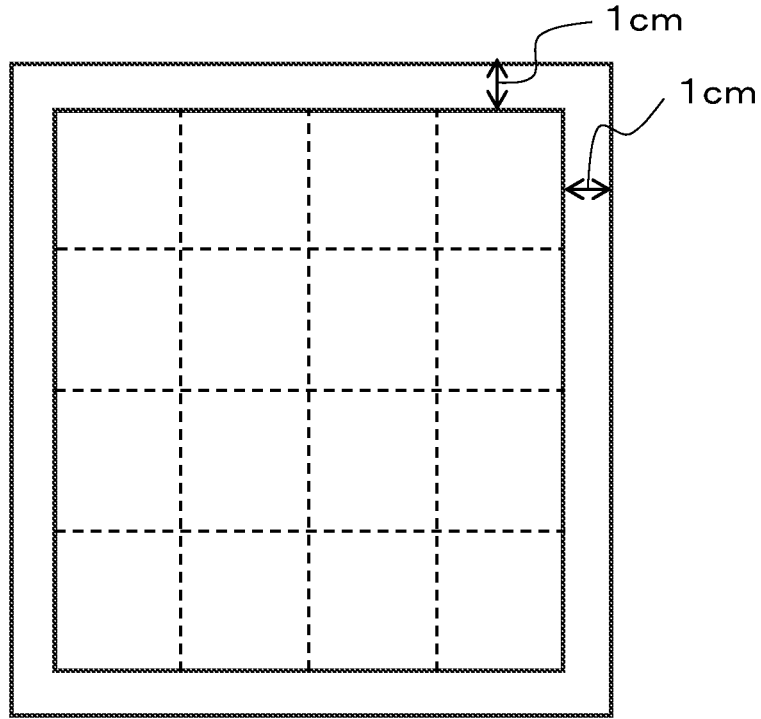
[Fig. 5]
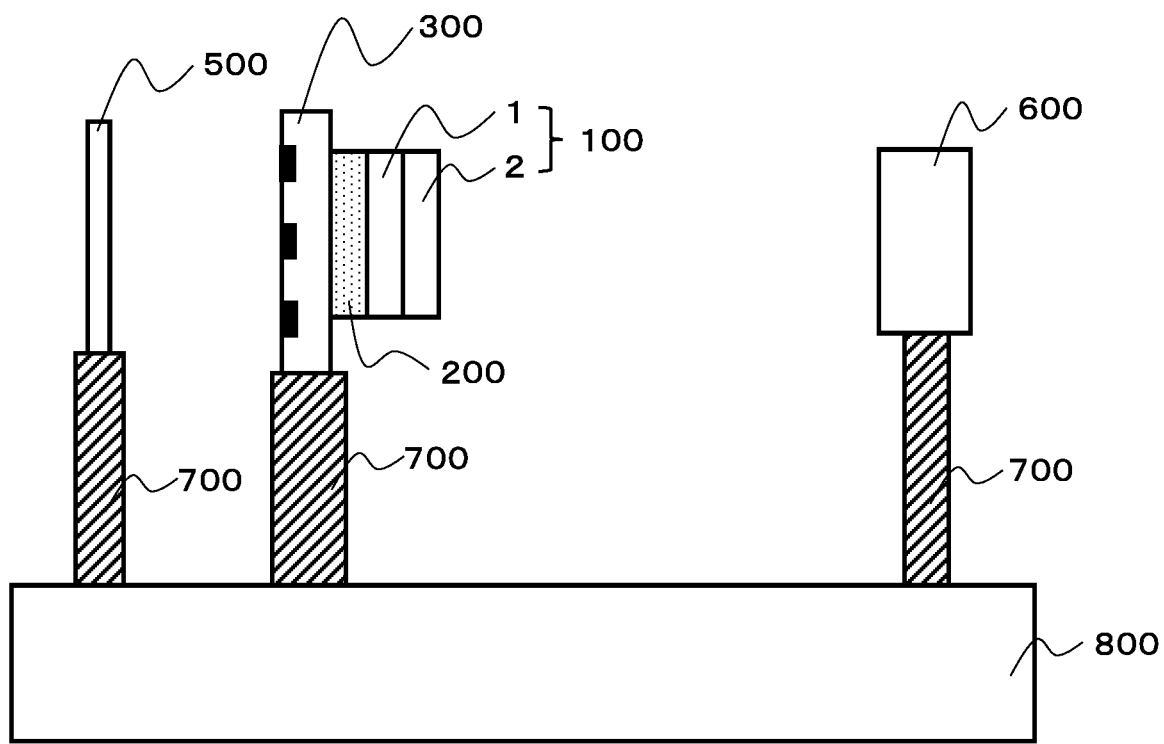

ANTI-GLARE FILM; ANTI-GLARE ARTICLE, TOUCHSCREEN, AND DISPLAY DEVICE USING SAME; AND METHOD FOR SELECTING ANTI-GLARE FILM

TECHNICAL FIELD

The present invention relates to an anti-glare film; an anti-glare article, a touchscreen and a display device using the anti-glare film; and a method for selecting an anti-glare film.

BACKGROUND ART

In an image display device including display elements such as liquid crystal display elements, an anti-glare film having an uneven structure may be installed on a surface on the light-emitting surface side of the display elements, for the purpose of suppressing the reflection of outside light.

However, in the case of using such an anti-glare film having an uneven structure on the light-emitting surface side of the display elements, a phenomenon (glare) in which subtle variations of luminance appear in image light occurs due to the uneven structure, thereby reducing the display quality, which is a problem. In particular, glare tends to increase in high-definition display elements.

As a technique to suppress such glare due to surface unevenness, an approach to increase the internal haze of the anti-glare film has been proposed. However, since the anti-glare film with enhanced internal haze reduces the resolution and contrast of display elements, it has not been possible to take advantage of the good visibility of ultra-high definition display elements in recent years.

Therefore, anti-glare films for the purpose of suppressing glare without enhancing the internal haze have been proposed (for example, PTLs 1 and 2).

CITATION LIST

Patent Literature

PTL 1: WO 2010/113827 A
PTL 2: JP 2016-35574 A (claim 1, paragraphs 0004 and 0069)

SUMMARY OF INVENTION

Technical Problem

PTL 1 proposes an anti-glare film with a maximum cross-sectional height (difference between the maximum height and the minimum height) of 0.6 µm or less.

However, in the case where the anti-glare film of PTL 1 is applied to an image display device, glare may not be suppressed depending on the type of the image display device, and it cannot have been applied to various image display devices.

PTL 2 proposes an anti-glare film having an uneven surface with an average interval Sm, an average inclination angle θa, and an arithmetic average surface roughness Ra set to predetermined values. Further, PTL 2 discloses that glare becomes remarkable when the gap on the back side of the anti-glare film (the gap between the display elements and the anti-glare film based on the thickness of the glass located on the back of the anti-glare film or the like) is large, and that glare can be suppressed when the gap is 700 µm or less.

The anti-glare film of PTL 2 can be applied to a larger number of image display devices as compared with the anti-glare film of PTL 1. However, the anti-glare film of PTL 2 has an allowable gap of 700 µm and could not suppress glare when the gap further increases.

Further, the study by the inventors has revealed a phenomenon that glare becomes more remarkable as the gap between the display elements and the anti-glare layer decreases, depending on the combination of the display device and the anti-glare film. Such a phenomenon shows a tendency opposite to the phenomenon described in PTL 2. That is, studies for suppressing glare have not been sufficient in PTL 2 from a display device with a small gap to a display device with a large gap.

The present invention has been accomplished under such a situation, and an object thereof is to provide an anti-glare film that can suppress glare in various display devices with different distances between the display elements and the anti-glare layer.

Solution to Problem

In order to solve the aforementioned problems, the present invention provides [1] to [10] below.

[1] An anti-glare film comprising an anti-glare layer, wherein the anti-glare layer has a 500-µm square area, as measured for surface roughness, satisfying condition 1 and condition 2 below, where the maximum peak height is defined as P, a plane having a height obtained by adding P/6 to the average height is defined as a first reference plane, the number of projections exceeding the first reference plane is defined as N1, a plane having a height obtained by adding P/3 to the average height is defined as a second reference plane, and the number of projections exceeding the second reference plane is defined as N2:

$P$ is 0.20 µm or more and 1.20 µm or less; and  <condition 1>

$0.20 \leq N2/N1 \leq 0.45$.  <condition 2>

[2] The anti-glare film according to [1], wherein the 500-µm square area satisfying condition 1 and condition 2 further satisfies condition 3 below, where a plane having a height obtained by adding P/2 to the average height is defined as a third reference plane, and the number of projections exceeding the third reference plane is defined as N3:

$0.20 \leq N3/N2 \leq 0.45$.  <condition 3>

[3] The anti-glare film according to [1] or [2], wherein the 500-µm square area satisfying condition 1 and condition 2 has a maximum height roughness PV of more than 0.60 µm and 1.50 µm or less.

[4] The anti-glare film according to any one of [1] to [3], wherein the 500-µm square area satisfying condition 1 and condition 2 has an arithmetic average roughness Sa of 0.020 µm or more and 0.070 µm or less.

[5] The anti-glare film according to any one of [1] to [4], having an internal haze of 6.0% or less.

[6] The anti-glare film according to any one of [1] to [5], wherein the sum of clarities of transmitted images $C_{0.125}$, $C_{0.25}$, $C_{0.5}$, $C_{1.0}$ and $C_{2.0}$, as measured for each of optical combs having widths of 0.125 mm, 0.25 mm, 0.5 mm, 1.0 mm and 2.0 mm according to JIS K7374:2007, is 380% or more, where the clarity of the transmitted image of the optical comb having a width of 0.125 mm is defined as $C_{0.125}$, the clarity of the transmitted image of the optical comb having a width of 0.25 mm is defined as $C_{0.25}$, the clarity of the transmitted image of the optical comb having a width of 0.5 mm is defined as $C_{0.5}$, the clarity of the transmitted image of the optical comb having a width of 1.0 mm is defined as $C_{1.0}$, and the clarity of the transmitted image of the optical comb having a width of 2.0 mm is defined as $C_{2.0}$.

[7] An anti-glare article comprising the anti-glare film according to any one of [1] to [6] arranged on a member such that the surface on the anti-glare layer side of the anti-glare film faces the front side of the anti-glare article.

[8] A touchscreen comprising a transparent substrate on its front surface, wherein the transparent substrate is the anti-glare film according to any one of [1] to [6] arranged so that the surface on the anti-glare layer side of the anti-glare film faces the front surface.

[9] A display device comprising: a display element; and an anti-glare film arranged on the light-emitting surface side of the display element, wherein the anti-glare film is the anti-glare film according to any one of [1] to [6] arranged so that the surface on the anti-glare layer side of the anti-glare film faces the opposite side of the display element.

[10] A method for selecting an anti-glare film comprising an anti-glare layer, the method comprising: determining, as a determination condition, whether or not the anti-glare layer has a 500-μm square area, as measured for surface roughness, satisfying condition 1 and condition 2 below, where the maximum peak height is defined as P, a plane having a height obtained by adding P/6 to the average height is defined as a first reference plane, the number of projections exceeding the first reference plane is defined as N1, a plane having a height obtained by adding P/3 to the average height is defined as a second reference plane, and the number of projections exceeding the second reference plane is defined as N2; and selecting the anti-glare layer satisfying the determination condition;

$P$ is 0.20 μm or more and 1.20 μm or less; and      <condition 1>

$0.20 \leq N2/N1 \leq 0.45$.      <condition 2>

Advantageous Effects of Invention

The anti-glare film of the present invention can suppress glare in various display devices with different distances between the display elements and the anti-glare layer. Further, an anti-glare film exerting the aforementioned effect can be appropriately selected by the method for selecting an anti-glare film of the present invention. Further, the display device of the present invention can suppress glare regardless of the distance between the display elements and the anti-glare layer. Further, the anti-glare article and the touchscreen of the present invention can impart the anti-glare property and touchscreen functions, while suppressing glare by application to display devices.

BRIEF DESCRIPTION OF DRAWINGS

FIG. 1 is a sectional view showing an embodiment of the anti-glare film of the present invention.

FIG. 2 is a sectional view showing another embodiment of the anti-glare film of the present invention.

FIG. 3 (a)-(b) include graphs for illustrating how to count N1, N2 and N3 for condition 2 and condition 3.

FIG. 4 is a diagram illustrating an example of measurement points when measuring parameters from a sample.

FIG. 5 is a diagram illustrating an approach for measuring glare.

DESCRIPTION OF EMBODIMENTS

Hereinafter, the embodiments of the present invention will be described.

[Anti-Glare Film]

The anti-glare film of the present invention comprises an anti-glare layer, and the anti-glare layer has a 500-μm square area, as measured for surface roughness, satisfying the following condition 1 and condition 2, where the maximum peak height is defined as P, a plane having a height obtained by adding P/6 to the average height is defined as the first reference plane, the number of projections exceeding the first reference plane is defined as N1, a plane having a height obtained by adding P/3 to the average height is defined as the second reference plane, and the number of projections exceeding the second reference plane is defined as N2:

$P$ is 0.20 μm or more and 1.20 μm or less; and      <condition 1>

$0.20 \leq N2/N1 \leq 0.45$.      <condition 2>

FIG. 1 and FIG. 2 are sectional views showing embodiments of the anti-glare film 10 of the present invention.

The anti-glare film 10 in FIG. 1 has a configuration including an anti-glare layer 2 on a transparent base material 1, whereas the anti-glare film 10 in FIG. 2 has a single-layer structure of the anti-glare layer 2.

<Condition 1>

The condition 1 stipulates that, when the 500-μm square area of the anti-glare layer is measured for surface roughness, P is 0.20 μm or more and 1.20 μm or less, where the maximum peak height of the area is defined as P.

In the case where P is less than 0.20 μm, the anti-glare property is insufficient. In the case where P is more than 1.20 μm, glare cannot be suppressed. Further, in the case where P is more than 1.20 μm, the configuration may be such that there are projections with extremely higher elevation as compared with the periphery. In such a case, the load is concentrated on the projections with higher elevation, and defects tend to occur in the anti-glare layer.

P is preferably 0.40 μm or more and 1.00 μm or less, more preferably 0.50 μm or more and 0.90 μm or less, further preferably 0.60 μm or more and 0.80 μm or less.

The maximum peak height (P) in the condition 1 is the maximum height on a rough curved surface in a target area (500-μm square area), when the height of the average plane in the target area (500-μm square area) is taken as 0.

The height of the average plane in the target area (500-μm square area) can be calculated by procedures (A1) to (A3) below. In Examples described below, the procedures (A1) and (A2) are carried out at the same time with analysis items, "Filter", "Filter Low Wavelen" and "FilterType", using Microscope Application of MetroPro ver. 8.3.2.

(A1) Obtaining a curved surface (wavy curved surface) by removing high-frequency components from the curved surface to be measured.

(A2) Obtaining a rough curved surface by subtracting the wavy curved surface from the curved surface to be measured.

(A3) Defining the average height of the rough curved surface as the average plane (height 0).

The maximum height (P) of the rough curved surface with reference to the average plane as a reference (0) is similar to the three-dimensional expansion of the maximum peak height (Rp) of the roughness curve of JIS B0601:2001, which is a two-dimensional parameter.

<Condition 2>

The condition 2 stipulates that, when the 500-μm square area of the anti-glare layer is measured for surface roughness, N2/N1 is 0.20 or more and 0.45 or less, where a plane having a height obtained by adding P/6 to the average plane of the area is defined as the first reference plane, the number of projections exceeding the first reference plane is defined as N1, a plane having a height obtained by adding P/3 to the average height is defined as the second reference plane, and the number of projections exceeding the second reference plane is defined as N2.

FIG. 3 includes graphs for illustrating how to count N1, N2 and N3 for the condition 2 and the condition 3 described later. Although the conditions 2 and 3 are three-dimensional parameters, FIG. 3 show two-dimensional data, for ease of the description.

First, the curves in FIG. 3 represent XZ cross sections at predetermined points in the 500-μm square area. In other words, the curves in FIG. 3 are cross-sectional curves at predetermined points in the 500-μm square area.

Of the four straight lines extending to the left and right in FIG. 3, the lowest solid straight line indicates the average plane (height 0) in the 500-μm square area. The average height of the curves in FIG. 3 is correctly located above the solid line in FIG. 3 but is located below in FIG. 3 for convenience. Further, of the remaining three dashed straight lines, the lower straight line indicates the height of "P/6", the straight line in the middle indicates the height of "P/3", and the upper straight line indicates the height of "P/2".

The number of projections exceeding P/6 is 9 in FIG. 3(a). Although FIG. 3(a) is two-dimensional, N1 in the condition 2 is the number of projections exceeding P/6 three-dimensionally counted in the 500-μm square area.

Further, the number of projections exceeding P/3 in FIG. 3(a) is 5. Although FIG. 3(a) is two-dimensional, N2 in the condition 2 is the number of projections exceeding P/3 three-dimensionally counted in the 500-μm square area.

Further, the number of projections exceeding P/2 in FIG. 3(a) is 1. Although FIG. 3(a) is two-dimensional, N3 in the condition 3 is the number of projections exceeding P/2 three-dimensionally counted in the 500-μm square area.

Regarding the condition 2 and the condition 3, the number of projections exceeding each of the first to third reference planes is obtained by counting each projection exceeding the reference plane and then falling below the reference plane as one projection. For example, two projections appear to be present in FIG. 3(b), and the number of projections exceeding P/2 is counted as 2 as they appear, but the number of projections exceeding P/3 and P/6 is counted as 1. In three dimensions, the aforementioned idea is extended, and the projections are cut at each of the first to third reference planes to leave only the upper side, each projection forming an independent area is counted as one projection. For example, in the case of the sectional shape in FIG. 3(b), the upper sides cut at the first reference plane (P/6) and the second reference plane (P/3) are each counted as one projection since the number of independent areas is 1, whereas the upper sides cut at the third reference plane (P/2) are counted as two projections since the number of independent areas is 2.

The "N2/N1" in the condition 2 indicates a ratio of the number of projections exceeding the height average to some extent (projections of height level 2) with respect to the number of projections slightly exceeding the height average (projections of height level 1). That is, the fact that N2/N1 is 0.20 or more and 0.45 or less means that the number of projections of height level 2 with respect to the number of projections of height level 1 is not excessively small and not excessively large.

Hereinafter, the reason why glare can be suppressed by setting N2/N1 to 0.20 or more and 0.45 or less, regardless of the distance between the display elements and the anti-glare layer will be described.

Glare is considered to occur due to surface unevenness of the anti-glare layer acting as lenses.

More specifically, image light that has passed through a surface unevenness (lens) is first refracted and focused on the focal point. Then, when the distance to the focal point (focal length) satisfies a predetermined condition, glare becomes noticeable.

In the anti-glare layer, a surface unevenness can be regarded as a lens, and the projection height can be regarded as the steepness of a peak. Therefore, if the incident angular distribution of image light on the surface unevenness is uniform, the distance to the focal point (focal length) depends on the projection height. That is, if the incident angular distribution of image light on the surface unevenness is uniform, glare can be suppressed by adjusting the projections to have a certain height so that the focal length falls within a certain range.

However, the distance between the display elements and the anti-glare film differs depending on the display device, and therefore the incident angular distribution of image light on the surface unevenness also differs. Therefore, in the case where the projections are adjusted to have a certain height, glare increases when the gap between the display elements and the anti-glare layer differs even if glare could be suppressed under a specific condition.

The fact that N2/N1 is 0.20 or more in the condition 2 indicates that a predetermined number or more of projections of height level 2 are contained with respect to the number of projections of height level 1. That is, the fact that N2/N1 is 0.20 or more means that projections with different focal lengths are mixed at a certain proportion. In this way, glare is suppressed from extremely increasing under a specific condition by mixing projections with different focal lengths, so that glare can be suppressed in various display devices with different distances between the display elements and the anti-glare layer.

Further, when N2/N1 is more than 0.45, the number of projections does not vary so much depending on the height level, and the projections have a certain height. That is, the fact that N2/N1 is 0.45 or less in the condition 2 also means that projections with different focal lengths are mixed, and glare can be suppressed in various display devices with different distances between the display elements and the anti-glare layer.

In the condition 2, N2/N1 is preferably 0.22 or more and 0.40 or less, more preferably 0.23 or more and 0.36 or less.

In the anti-glare film, the 500-μm square area satisfying the condition 1 and the condition 2 may be present at least in a part, but the 500-μm square area preferably satisfies the condition 1 and the condition 2 at seven or more points out of the nine measurement points shown below, more preferably at eight or more points, further preferably at all of the nine points. The same applies to other parameters for the surface shape in the condition 3 described later and the like.

In the nine measurement points, the nine intersections, when an area of 1 cm from each outer edge of a measurement sample is taken as a margin, of lines drawn to divide the area inside the margin into four equal parts in the vertical direction and the horizontal direction are preferably used as the centers of measurement. For example, in the case of a quadrangular measurement sample, the surface roughness of the 500-μm square area is preferably measured using the nine intersections, when an area of 1 cm from each outer edge of the quadrangle is taken as a margin, of dotted lines dividing the area inside the margin into four equal parts in the vertical direction and the horizontal direction as the centers, as shown in FIG. 4. In the case where the measurement sample has a shape other than the quadrangular shape, such as circular, elliptical, triangular, pentagonal and other shapes, it is preferable that a quadrangle inscribed in such a shape be drawn, and the quadrangle be measured at the nine points by the aforementioned approach.

Further, in the case where the anti-glare film is in the form of a roll, it is preferable that the anti-glare film in the form of a roll be cut out into the form of a sheet, and the sample cut out be measured at the nine points by the aforementioned approach.

In this description, the surface roughness of the 500-μm square area of the anti-glare layer is measured using a white interference microscope with the cutoff value λc (which corresponds to "Filter Low Wavelen" in Examples) set to 250 μm.

Variations in various parameters for the surface shape and the optical properties or the like measured at the aforementioned nine points is preferably ±10% of the average, more preferably ±8% of the average, further preferably ±6% of the average.

The measured values of the parameters for the surface shape and the optical properties or the like of the anti-glare film may not have normal distributions, but the effect based on each parameter is not inhibited at least within such a range of variations. The reason why the measured values of the parameters of the anti-glare film may not have normal distributions is considered as follows.

When an anti-glare layer-coating solution is applied to a transparent base material, the existence ratio of insoluble components such as particles contained in the anti-glare layer-coating solution is not constant, depending on the position in a plane of the anti-glare film. That is, the composition in the coating film delicately differs depending on the position in the plane at the time when the anti-glare layer-coating solution is applied onto the transparent base material and dried. Since there can be no complete laminar flow in the drying air, the drying conditions also differ depending on the position in the plane. Moreover, the drying rate of the coating film does not change linearly but changes non-linearly due to these factors. Due to such causes, it is considered that the haze of the anti-glare film and the measured values of the surface shape may not have normal distributions.

According to one embodiment of the anti-glare film of the present invention, the 500-μm square area satisfying condition 1 and condition 2 preferably further satisfies the following condition 3, where a plane having a height obtained by adding P/2 to the average height is defined as the third reference plane, and the number of projections exceeding the third reference plane is defined as N3:

$$0.20 \leq N3/N2 \leq 0.45.$$ <condition 3>

The fact that N3/N2 is 0.20 or more in the condition 3 indicates that a predetermined number or more of projections significantly exceeding the height average (projections of height level 3) are contained with respect to the number of projections exceeding the height average to some extent (projections of height level 2).

Accordingly, when N3/N2 is 0.20 or more to satisfy the condition 3, surface unevenness with different focal lengths are further mixed, and glare can be further suppressed in various display devices with different distances between the display elements and the anti-glare layer.

Further, when N3/N2 is excessively large, the number of projections does not vary so much depending on the height level, and the projections have a certain height. That is, the fact that N3/N2 is 0.45 or less in the condition 3 also means that projections with different focal lengths are mixed, and glare can be suppressed in various display devices with different distances between the display elements and the anti-glare layer.

In the condition 3, N3/N2 is more preferably 0.22 or more and 0.40 or less, further preferably 0.23 or more and 0.36 or less.

According to one embodiment of the anti-glare film of the present invention, N1 (the number of projections exceeding the first reference plane in the 500-μm square area) is preferably 100 to 1000, more preferably 150 to 800, further preferably 250 to 700.

Setting the N1 to 100 or more makes it easy to achieve good anti-glare property and makes it difficult to allow wide projections that tend to increase glare to be present, thereby making it easy to suppress glare. Further, setting the N1 to 1000 or less can make it easy to achieve good resolution and good contrast.

According to one embodiment of the anti-glare film of the present invention, N2 (the number of projections exceeding the second reference plane in the 500-μm square area) is preferably 30 to 500, more preferably 50 to 400, further preferably 70 to 250.

According to one embodiment of the anti-glare film of the present invention, N3 (the number of projections exceeding the third reference plane in the 500-μm square area) is preferably 10 to 100, more preferably 15 to 80, further preferably 20 to 60.

According to one embodiment of the anti-glare film of the present invention, the maximum height roughness PV in the 500-μm square area satisfying condition 1 and condition 2 is preferably more than 0.60 μm and 1.50 μm or less, more preferably 0.65 μm or more and 1.20 μm or less, further preferably 0.70 μm or more and 1.00 μm or less.

Setting the PV to more than 0.60 μm can further improve the anti-glare property. Setting the PV to 1.50 μm or less can facilitate suppressing the deterioration of the visibility due to foreign matter.

The maximum height roughness (PV) in this description is represented by the following formula when the maximum value of the height of the rough curved surface in the 500-μm square area is defined as Hp, and the minimum value of the height of the curved surface is defined as Hv.

$$Hp - Hv = PV$$

The maximum height roughness (PV) is similar to the three-dimensional expansion of the maximum height roughness (Rz) of the roughness curve according to JIS B0601: 2001, which is a two-dimensional parameter.

According to one embodiment of the anti-glare film of the present invention, the arithmetic average roughness Sa in the 500-μm square area satisfying condition 1 and condition 2 is preferably 0.020 μm or more and 0.070 μm or less, more preferably 0.025 μm or more and 0.065 μm or less, further preferably 0.030 μm or more and 0.060 μm or less.

Setting the Sa to 0.020 μm or more can further improve the anti-glare property. Further, setting the Sa to 0.070 μm or less can facilitate suppressing the deterioration of the resolution.

The arithmetic average roughness (Sa) in this description is represented by formula (i) below when the rough curved surface is expressed as a height z (x, y) at any point on an xy plane, and the area of the target area is defined as A (A=Lx×Ly, where Lx and Ly are respectively the side lengths in the x direction and the y direction of the target area).

The Sa is similar to the three-dimensional expansion of the arithmetic average roughness (Ra) of the roughness curve according to JIS B0601:2001, which is a two-dimensional parameter.

$$Sa = \frac{1}{A}\int_0^{L_x}\int_0^{L_y}|Z(x, y)|dxdy \quad \text{(i)}$$

In formula (i), "A=Lx×Ly".

According to one embodiment of the anti-glare film of the present invention, the ten-point average roughness Sz in the 500-µm square area satisfying the condition 1 and the condition 2 is preferably 0.20 µm or more and 1.20 µm or less, more preferably 0.35 µm or more and 1.00 µm or less, further preferably 0.50 µm or more and 0.80 µm or less.

Setting the Sz to 0.20 µm or more can facilitate improving the anti-glare property and suppress the surface unevenness from being excessively uniform, thereby making it difficult to notice scratches and defects of the anti-glare layer. Further, setting the Sz to 1.20 µm or less can suppress the deterioration of the contrast.

The ten-point average roughness (Sz) in this description is represented by the following formula when one higher than the average plane is defined as a peak, and one lower than the average plane is defined as a valley in each area projecting from the average plane on a rough curved surface, and the maximum value of the peak height is defined as the peak top, and the minimum value of the valley height is defined as the valley bottom, the peak top heights from the highest to the 5th peak tops are respectively defined as P1, P2, P3, P4, and P5, and the valley bottom heights from the lowest to the 5th valley bottoms are respectively defined as V1, V2, V3, V4, and V5 (referring to the average plane, P1 to P5 are positive, and V1 to V5 are negative).

$$Sz=\{(P1+P2+P3+P4+P5)-(V1+V2+V3+V4+V5)\}/5$$

The Sz is similar to the three-dimensional expansion of the ten-point average roughness (Rzjis) according to JIS B0601:2001, which is a two-dimensional parameter.

According to one embodiment of the anti-glare film of the present invention, Sz/Sa is preferably 10.0 or more and 22.0 or less, more preferably 12.0 or more and 20.0 or less, further preferably 13.0 or more and 18.0 or less, in the 500-µm square area satisfying the condition 1 and the condition 2.

Setting the Sz/Sa to 10.0 or more can suppress the surface unevenness from being excessively uniform, thereby making it difficult to notice scratches and defects on the anti-glare layer. In general, setting the Sz/Sa to a large value such as 10.0 or more tends to increase glare, but the present invention can suppress glare even if the Sz/Sa is large by satisfying the condition 1 and the condition 2. Further, setting the Sz/Sa to 22.0 or less can facilitate suppressing the deterioration of the visibility due to foreign matter.

<Optical Properties>

According to one embodiment of the anti-glare film of the present invention, the internal haze is preferably 6.0% or less, more preferably 4.5% or less, further preferably 3.0% or less, furthermore preferably 1.5% or less.

Setting the internal haze to 6.0% or less can facilitate suppressing the deterioration of the resolution and the contrast of the display elements. As the display elements get away from the anti-glare film, the resolution tends to decrease due to the internal haze. Therefore, setting the internal haze to 6.0% or less is effective in relation to the subject of the present invention.

In this description, the optical properties such as the internal haze mean averages of the measured values at the aforementioned nine points. The internal haze and the surface haze can be determined, for example, by the methods according to Examples.

According to one embodiment of the anti-glare film of the present invention, the surface haze is preferably 1.0 to 15.0%, more preferably 2.0 to 10.0%, further preferably 3.0 to 8.0%.

Setting the surface haze to 1.0% or more can facilitate improving the anti-glare property. Further, setting the surface haze to 15.0% or less can facilitate suppressing the deterioration of the resolution and the contrast of the display elements.

According to one embodiment of the anti-glare film of the present invention, the total light transmittance of JIS K7361-1:1997 is preferably 80% or more, more preferably 85% or more, further preferably 90% or more.

According to one embodiment of the anti-glare film of the present invention, the sum of clarities of transmitted images $C_{0.125}$, $C_{0.25}$, $C_{0.5}$, $C_{1.0}$ and $C_{2.0}$, as measured for each of optical combs having widths of 0.125 mm, 0.25 mm, 0.5 mm, 1.0 mm and 2.0 mm according to JIS K7374:2007, is preferably 380% or more, where the clarity of the transmitted image of the optical comb having a width of 0.125 mm is defined as $C_{0.125}$, the clarity of the transmitted image of the optical comb having a width of 0.25 mm is defined as $C_{0.25}$, the clarity of the transmitted image of the optical comb having a width of 0.5 mm is defined as $C_{0.5}$, the clarity of the transmitted image of the optical comb having a width of 1.0 mm is defined as $C_{1.0}$, and the clarity of the transmitted image of the optical comb having a width of 2.0 mm is defined as $C_{2.0}$.

Setting the sum of $C_{0.125}$, $C_{0.25}$, $C_{0.5}$, $C_{1.0}$ and $C_{2.0}$ to 380% or more can facilitate suppressing the deterioration of the resolution. The sum of $C_{0.125}$, $C_{0.25}$, $C_{0.5}$, $C_{1.0}$ and $C_{2.0}$ is more preferably 400% or more, further preferably 450% or more. The upper limit of the sum of $C_{0.125}$, $C_{0.25}$, $C_{0.5}$, $C_{1.0}$ and $C_{2.0}$ is about 490%.

According to one embodiment of the anti-glare film of the present invention, the difference between $C_{2.0}$ and $C_{0.125}$ is preferably 10.0% or less, more preferably 7.5% or less, further preferably 5.0% or less, furthermore preferably 3.0% or less.

The difference between $C_{2.0}$ and $C_{0.125}$ of 10.0% or less can mean that the number of wide projections that tend to increase glare is small. Accordingly, setting the difference between $C_{2.0}$ and $C_{0.125}$ to 10.0% or less can further facilitate suppressing glare. Further, the fact that the difference between $C_{2.0}$ and $C_{0.125}$ is 10.0% or less can mean that, of the light transmitted through the anti-glare film, the proportion of light diffused at high angles is small. Accordingly, setting the difference between $C_{2.0}$ and $C_{0.125}$ to 10.0% or less can facilitate suppressing the deterioration of the resolution due to the display elements being away from the anti-glare film.

$C_{0.125}$, $C_{0.25}$, $C_{0.5}$, $C_{1.0}$ and $C_{2.0}$ are each preferably 80% or more, more preferably 85% or more, further preferably 90% or more. Setting each of $C_{0.125}$, $C_{0.25}$, $C_{0.5}$, $C_{1.0}$ and $C_{2.0}$ to 80% or more can facilitate suppressing glare.

<Layer Structure>

The anti-glare film may be a single layer of the anti-glare layer or may be a multilayer having the anti-glare layer on a transparent base material. In view of the handleability and ease of production, a configuration of having the anti-glare layer on the transparent base material is suitable.

Further, the anti-glare film may have functional layers such as an antireflection layer, an antifouling layer, and an antistatic layer.

The anti-glare film preferably has a substantially smooth surface on the opposite side of the side satisfying the conditions 1 and 2. For example, in the case where the anti-glare film is a single layer of the anti-glare layer, the surface on the opposite side of the uneven surface side is preferably substantially smooth. Further, in the case of the configuration in which the anti-glare film has the anti-glare layer on the transparent base material, the surface of the transparent base material on the opposite side of the surface having the anti-glare layer is preferably substantially smooth. Further, in the case where the anti-glare film has a functional layer on the outermost surface on the opposite side of the anti-glare layer, the surface of the functional layer is preferably substantially smooth. Here, to be substantially smooth means to have an Sa of less than 0.020 μm.

<<Anti-Glare Layer>>

The uneven shape on the surface of the anti-glare layer can be formed, for example, by (A) a method using an embossing roll, (B) etching, (C) molding, (D) forming a coating film by coating, or the like. Among these methods, (C) molding is suitable, in view of the reproducibility of the uneven shape, and (D) forming a coating film by coating is suitable, in view of the productivity and for supporting a wide variety of products.

For molding, a product can be produced by producing a mold having a shape complementary to the uneven shape of the surface of the anti-glare layer, pouring a material constituting the anti-glare layer such as a polymer resin and glass into the mold, followed by curing, and then taking out the resultant from the mold. In the case of using a transparent base material, a product can be produced by pouring a polymer resin or the like into a mold, stacking the transparent base material thereon, curing the polymer resin or the like, and taking out the resultant with the transparent base material from the mold. In the case of adding particles or an additive to the anti-glare layer, the particles or the additive may be further poured into the mold when the polymer resin or the like is poured.

For forming a coating film by coating, a product can be formed by applying an anti-glare layer-coating solution containing a binder resin component, particles and a solvent onto the transparent base material by known application methods such as gravure coating and bar coating, followed by drying and curing, as required.

In order for the anti-glare film to easily satisfy the conditions 1 and 2, it is preferable to use the suitable materials described later as the binder resin component, the particles and the solvent.

—Particles—

The particles preferably contain particles with an average particle size of 0.5 to 5.0 μm and inorganic particles with an average particle size of 1 to 50 nm.

Hereinafter, the particles with an average particle size of 0.5 to 5.0 μm may be referred to as "large particles", and inorganic particles with an average particle size of 1 to 50 nm may be referred to as "inorganic fine particles".

——Large Particles——

The particles with an average particle size of 0.5 to 5.0 μm (large particles) to be used can be either organic or inorganic. Setting the average particle size of the large particles to such a range can facilitate satisfying the condition 1.

The average particle size of the large particles is preferably 1.0 to 4.0 μm, more preferably 1.5 to 3.0 μm.

In the case where the large particles have excessively high dispersibility in the anti-glare layer, the projection heights tend to be aligned, and therefore it is difficult to set the N2/N1 to 0.20 or more and 0.45 or less. Meanwhile, in the case where the large particles excessively aggregate in the anti-glare layer, the projections become too large, and the maximum peak height P may be more than 1.20 μm.

Accordingly, it is preferable to appropriately control the dispersion of the large particles so as to allow the large particles dispersed and the large particles aggregated in the anti-glare layer to be present in a balanced manner.

The large particles may be a mixture of those with two or more types of average particle sizes, but it is preferable to use those with one type of average particle size, for facilitating controlling the dispersion and satisfying the conditions 2 and 3.

The average particle size of the large particles can be calculated by the following operations (i) to (iii).

(i) Capturing a transmission observation image of the anti-glare film with an optical microscope. The magnification is preferably 500 to 2000 times.

(ii) Extracting any 10 large particles from the observation image to calculate the particle size of each large particle. The particle size is measured as a distance between two straight lines combined so that, when the cross section of the large particle is sandwiched by any two parallel straight lines, the distance between the two straight lines is maximum.

(iii) Performing the same operations 5 times on the observation image on another screen of the same sample, to give the value obtained from the number average of the particle sizes of a total of 50 particles as the average particle size of the large particles.

However, when the large particle cannot be optically observed, the following operations (iv) to (vi) are adopted.

(iv) Producing a segment having a cross section passing through the center of the large particle from the anti-glare film with a microtome. The thickness of the segment is preferably 70 nm to 100 nm. In order to obtain a segment having a cross section passing through the center, a plurality of segments can be continuously produced for one large particle, and the segment with the maximum particle size calculated from each segment by the operation (v) can be used as the segment having a cross section passing through the center.

(v) Observing the segment obtained by scanning electron microscope (STEM) to calculate the particle size. The method for calculating the particle size is the same as in the operation (ii). The magnification is preferably 5000 to 20000 times.

(vi) Performing these operations on 20 particles, to give the value obtained from the number average of the sizes of the 20 particles as the average particle size of the large particles.

Examples of the shape of the large particles include spherical, disk-like, rugby ball-like, and irregular shapes, and further include hollow particles, porous particles and solid particles of these shapes. Among these, spherical solid particles are suitable for suppressing glare.

Examples of the organic particles include particles composed of polymethylmethacrylate, polyacrylic-styrene copolymer, melamine resin, polycarbonate, polystyrene, polyvinyl chloride, benzoguanamine-melamine-formaldehyde condensate, silicone, fluorine resins and polyester resins.

Examples of the inorganic particles include particles composed of silica, alumina, zirconia and titania.

Among the aforementioned large particles, organic particles that facilitate controlling the dispersion and satisfying the conditions 2 and 3 are suitable. Further, the organic particles are also suitable in that the organic particles having a small specific gravity can easily emerge near the surface of the anti-glare layer when used in combination with inorganic fine particles and thus can facilitate exerting the anti-glare property.

Among the organic particles, polyacrylic-styrene copolymer particles are suitable. The polyacrylic-styrene copolymer particles are good in that the refractive index and the degree of hydrophilicity or hydrophobicity are easily controlled, and thus the internal haze and the dispersion are easily controlled.

In the case of using polyacrylic-styrene copolymer particles as the large particles, the dispersibility is enhanced by increasing the proportion of styrene to increase the hydrophobicity, whereas the particles tend to aggregate by reducing the proportion of styrene on the contrary. The proportions of acrylic and styrene constituting the polyacrylic-styrene copolymer particles can be determined with reference to the refractive index of the particles. Specifically, since styrene has a higher refractive index than acrylic, it can be said that the higher the refractive index of the polyacrylic-styrene copolymer particles, the higher the proportion of styrene.

The content of the large particles is preferably 1 to 25 mass %, more preferably 2 to 10 mass %, in the total solid content forming the anti-glare layer, in order to facilitate satisfying the conditions 1 and 2 and the like.

——Inorganic Fine Particles——

Examples of the inorganic particles with an average particle size of 1 to 50 nm (inorganic fine particles) include fine particles composed of silica, alumina, zirconia, titania and the like. Among these, silica is suitable since it easily suppresses the occurrence of internal haze.

The average particle size of the inorganic fine particles is preferably 10 to 40 nm, more preferably 20 to 30 nm.

The average particle size of the inorganic fine particles can be calculated by the following operations (i) to (iii).
(i) Capturing an image of the cross section of the anti-glare film by TEM or STEM. It is preferable that the acceleration voltage of TEM or STEM be set to 10 kV to 30 kV, and the magnification be set to 50000 to 300000 times. For example, observation can be performed using the product name "S-4800 (TYPE 2)", available from Hitachi High-Tech Corporation in the STEM observation mode. After a sample is cut into a size that can be placed on a sample table, it is pasted with a silver paste or a carbon paste, and Pt—Pd is sputtered for about 20 seconds to improve the conduction. At the aforementioned acceleration voltage and an emission current of 10 µA using a detector: TE, the focus is adjusted, and the contrast and the luminance are appropriately adjusted while observing whether or not the contour of each particle is distinguished within a range of 50000 to 300000 times. When capturing the image, the apertures may be further adjusted to a beam monitor aperture of 3 and an objective lens aperture of 3, and the W.D. may be set to 8 mm. In the case where the particle contour is difficult to observe due to insufficient contrast, staining with osmium tetroxide, ruthenium tetroxide, phosphotungstic acid or the like may be applied as a pretreatment.

(ii) Extracting any 10 inorganic fine particles from the observation image, to calculate the particle size of each inorganic fine particle. The particle size is measured as a distance between two straight lines combined so that, when the cross section of the inorganic fine particle is sandwiched by any two parallel straight lines, the distance between the two straight lines is maximum.
(iii) Performing the same operations 5 times on the observation image on another screen of the same sample, to give the value obtained from the number average of the particle sizes of a total of 50 particles as the average particle size of the inorganic fine particles.

As the inorganic fine particles are compared with the large particles composed of organic particles, it can be said that the inorganic fine particles have a strong hydrophilicity and the large particles have a strong hydrophobicity. Accordingly, the anti-glare layer-coating solution containing the inorganic fine particles facilitates dispersing the large particles in the coating solution. However, in the case where the large particles are excessively dispersed in the coating solution, it becomes difficult to satisfy the condition 2 and the condition 3.

Therefore, it is preferable to add a large amount of inorganic fine particles to increase the viscosity of the anti-glare layer-coating solution, so that the large particles are not excessively dispersed.

The content of inorganic fine particles is preferably 20 to 90 mass %, more preferably 30 to 80 mass %, further preferably 40 to 60 mass %, in the total solid content forming the anti-glare layer.

Setting the content within such a range can facilitate appropriately dispersing the large particles and satisfying the conditions 2 and 3 by suppressing polymerization shrinkage of the binder resin.

Further, in order to facilitate satisfying the conditions 2 and 3, the content ratio of large particles to inorganic fine particles (content of large particles/content of inorganic fine particles) in the anti-glare layer is preferably 0.03 to 0.3, more preferably 0.05 to 0.2.

The inorganic fine particles are preferably reactive inorganic fine particles with a reactive group introduced therein by surface treatment. Introducing a reactive group enables a large amount of inorganic fine particles to be contained in the anti-glare layer and can facilitate satisfying the conditions 2 and 3.

As the reactive group, a polymerizable unsaturated group is suitably used, preferably a photocurable unsaturated group, particularly preferably an ionizing radiation curable unsaturated group. Specific examples thereof include ethylenically unsaturated bonds such as a (meth)acryloyl group, a (meth)acryloyloxy group, a vinyl group and an allyl group, and an epoxy group.

Examples of such reactive inorganic fine particles can include inorganic fine particles that are surface-treated with a silane coupling agent. In order to treat the surfaces of inorganic fine particles with a silane coupling agent, a dry process of spraying a silane coupling agent to inorganic fine particles, a wet process of dispersing inorganic fine particles in a solvent and then adding a silane coupling agent for reaction, or the like can be used.

The anti-glare layer preferably has an area with a high density of inorganic fine particles in the vicinity of a surface. The area is preferably 5 to 200 nm, more preferably 20 to 100 nm, in the thickness direction from the surface of the anti-glare layer. Having an area with a high density of inorganic fine particles in the vicinity of a surface can suppress the polymerization shrinkage in the vicinity of the surface of the anti-glare layer from varying at each location in the plane and can suppress the in-plane residual strain from being non-uniform. As a result, when a functional layer is formed on the anti-glare layer, it becomes easy to suppress the peeling of the functional layer.

The inorganic fine particles are preferably present substantially uniformly in a portion other than the vicinity of the surface of the anti-glare layer.

——Binder Resin——

The binder resin of the anti-glare layer preferably contains a cured product of a thermosetting resin composition or a cured product of an ionizing radiation curable resin composition, more preferably a cured product of an ionizing radiation curable resin composition, for further improving the mechanical strength.

In order to facilitate dispersing the large particles and controlling aggregation by adjusting the viscosity of the anti-glare layer-coating solution, the binder resin preferably contains a thermoplastic resin in addition to the ionizing radiation curable resin composition. The thermoplastic resin tends to increase the viscosity of the anti-glare layer-coating solution as compared with the ionizing radiation curable resin composition.

The thermosetting resin composition is a composition at least containing a thermosetting resin and is a resin composition cured by heating.

Examples of the thermosetting resin include acrylic resins, urethane resins, phenolic resins, urea melamine resins, epoxy resins, unsaturated polyester resins, and silicone resins. In the thermosetting resin composition, a curing agent is added to these curable resins, as required.

The ionizing radiation curable resin composition is a composition containing a compound having an ionizing radiation curable functional group (which may be hereinafter referred to as "ionizing radiation curable compound"). Examples of the ionizing radiation curable functional group include ethylenically unsaturated bond groups such as a (meth)acryloyl group, a vinyl group, and an allyl group, an epoxy group, and an oxetanyl group. The ionizing radiation curable compound is preferably a compound having an ethylenically unsaturated bond group, more preferably a compound having two or more ethylenically unsaturated bond groups. Among them, polyfunctional (meth)acrylate compounds having two or more ethylenically unsaturated bond groups are further preferable. Both monomers and oligomers can be used as the polyfunctional (meth)acrylate compounds.

The ionizing radiation means electromagnetic waves or charged particle beams that have energy quanta capable of polymerizing or crosslinking molecules. Ultraviolet rays (UV) or electron beams (EB) are generally used, but in addition, electromagnetic waves such as X-rays and γ-rays, and charged particle beams such as α-rays and ion rays also can be used.

Among the aforementioned polyfunctional (meth)acrylate compounds, examples of bifunctional (meth)acrylate monomers include ethylene glycol di(meth)acrylate, bisphenol A tetraethoxy diacrylate, bisphenol A tetrapropoxy diacrylate, and 1,6-hexanediol diacrylate.

Examples of trifunctional or higher (meth)acrylate monomers include trimethylolpropane tri(meth)acrylate, pentaerythritol tri(meth)acrylate, pentaerythritol tetra(meth)acrylate, dipentaerythritol hexa (meth)acrylate, dipentaerythritol tetra(meth)acrylate, and isocyanuric acid-modified tri(meth)acrylate.

Further, the (meth)acrylate monomers may be obtained by partially modifying the molecular skeleton with ethylene oxide, propylene oxide, caprolactone, isocyanuric acid, alkyl, cyclic alkyl, aromatic, bisphenol, or the like (modified (meth)acrylate monomers). The modified (meth)acrylate monomers are preferable in that they can facilitate suppressing the shrinkage unevenness due to crosslinking. In this way, suppressing the shrinkage unevenness of the anti-glare layer can suppress the in-plane residual strain from being non-uniform and can facilitate suppressing, when a functional layer is formed on the anti-glare layer, peeling of the functional layer.

The modified (meth)acrylate monomers are preferably modified with alkylene oxides such as ethylene oxide and propylene oxide, in order to increase the affinity with inorganic fine particles and facilitate suppressing the aggregation of inorganic fine particles.

Examples of the alkylene oxide-modified (meth)acrylate monomers include bisphenol F alkylene oxide-modified di(meth)acrylate, bisphenol A alkylene oxide-modified di(meth)acrylate, isocyanuric acid alkylene oxide-modified di(meth)acrylate, polyalkylene glycol di(meth)acrylate, trimethylolpropane alkylene oxide-modified tri(meth)acrylate, and isocyanuric acid alkylene oxide-modified tri(meth)acrylate.

The content of the modified (meth)acrylate monomers is preferably 10 to 80 mass %, more preferably 20 to 70 mass %, further preferably 30 to 50 mass %, in the total amount of ionizing radiation curable compounds.

Examples of the polyfunctional (meth)acrylate oligomers include acrylate polymers such as urethane (meth)acrylate, epoxy (meth)acrylate, polyester (meth)acrylate, and polyether (meth)acrylate.

The urethane (meth)acrylate is obtained, for example, by a reaction of a polyhydric alcohol and an organic diisocyanate with a hydroxy (meth)acrylate.

Preferable examples of the epoxy (meth)acrylate include a (meth)acrylate obtained by a reaction of a trifunctional or higher aromatic epoxy resin, alicyclic epoxy resin, or aliphatic epoxy resin with (meth)acrylic acid, a (meth)acrylate obtained by a reaction of a bifunctional or higher aromatic epoxy resin, alicyclic epoxy resin, or aliphatic epoxy resin and a polybasic acid with (meth)acrylic acid, and a (meth)acrylate obtained by a reaction of a bifunctional or higher aromatic epoxy resin, alicyclic epoxy resin, or aliphatic epoxy resin and a phenol with (meth)acrylic acid.

One of the aforementioned ionizing radiation curable compounds can be used alone, or two or more of them can be used in combination.

In the case where the ionizing radiation curable compound is an ultraviolet curable compound, the ionizing radiation curable composition preferably contains an additive such as a photopolymerization initiator and a photopolymerization accelerator.

Examples of the photopolymerization initiator include one or more selected from the group consisting of acetophenones, benzophenones, α-hydroxyalkylphenones, Michler's ketone, benzoin, benzyl dimethyl ketal, benzoyl benzoate, α-acyloxime esters, and thioxanthones.

The photopolymerization accelerator can reduce the polymerization inhibition by air at the time of the curing and accelerate the curing rate. Examples thereof include one or more selected from the group consisting of p-dimethylaminobenzoic acid isoamyl ester and p-dimethylaminobenzoic acid ethyl ester.

As the thermoplastic resin, acrylic resins, cellulose resins, urethane resins, vinyl chloride resins, polyester resins, polyolefin resins, polycarbonates, nylons, polystyrenes and ABS resins can be used. Among these, acrylic resins are preferable. Among the acrylic resins, polymethylmethacrylate (PMMA) is suitable.

The thermoplastic resin preferably has a weight-average molecular weight, as measured by GPC, of 20000 to 200000, more preferably 50000 to 100000, in terms of polystyrene, in order to adjust the viscosity of the anti-glare layer-coating solution to a suitable range.

The content of the thermoplastic resin is preferably 10 to 30 mass %, more preferably 15 to 25 mass %, in the total amount of binder resins in the anti-glare layer.

The thickness of the anti-glare layer is preferably 1 to 10 µm, more preferably 2 to 7 µm, in view of the balance of the curl suppression, the mechanical strength, the hardness and the toughness.

Variations in the thickness of the anti-glare layer are preferably within ±15%, more preferably within ±10%, further preferably within ±7%, furthermore preferably within 5%, with respect to the average film thickness.

The thickness of the anti-glare layer can be calculated by selecting any 20 points in the cross-sectional image of the anti-glare film by a scanning transmission electron microscope (STEM) from the average thereof.

The ratio of the average particle size of the large particles to the thickness of the anti-glare layer (Average particle size of large particles/thickness of anti-glare layer) is preferably 0.50 to 0.85, more preferably 0.55 to 0.80, for facilitating satisfying the conditions 1 to 3 and the like.

——Solvent——

For the anti-glare layer-coating solution, a solvent is generally used for adjusting the viscosity and making each component soluble or dispersible. Since the surface shape of the anti-glare layer after coating or drying is different depending on the type of the solvent, the solvent is preferably selected in consideration of the saturated vapor pressure of the solvent, the permeability of the solvent into the transparent base material, and the like.

Specifically, examples of the solvent can include ketones (such as acetone, methyl ethyl ketone, methyl isobutyl ketone, and cyclohexanone), ethers (such as dioxane and tetrahydrofuran), aliphatic hydrocarbons (such as hexane), alicyclic hydrocarbons (such as cyclohexane), aromatic hydrocarbons (such as toluene and xylene), carbon halides (such as dichloromethane and dichloroethane), esters (such as methyl acetate, ethyl acetate, and butyl acetate), alcohols (such as n-butyl alcohol and cyclohexanol), glycol ethers (such as ethyl cellosolve, propylene glycol monomethyl ether, and propylene glycol monomethyl ether acetate), sulfoxides (such as dimethylsulfoxide), and amides (such as dimethylformamide and dimethylacetamide), and may be mixtures of these.

In a general coating solution, a solvent having a high drying rate is selected, in order to prevent the aggregation of particles.

However, in the case where only a solvent having a high drying rate is contained, the large particles are difficult to aggregate, and it becomes difficult to satisfy the condition 2 and the condition 3. Therefore, a solvent having a low drying rate is also preferably contained as the solvent.

Meanwhile, in the case where a solvent having a low drying rate is mixed with a solvent having a high drying rate, the dispersibility of large particles may drastically change, and the large particles may excessively aggregate. Therefore, a glycol ether solvent is preferably used as a solvent having a low drying rate. While having a low drying rate and thus facilitates the aggregation of the large particles, the glycol ether solvent is hydrophilic as compared with other solvents and thus is difficult to allow the aggregation of the large particles (organic particles) as compared with other solvents. That is, use of a glycol ether solvent as a solvent having a low drying rate does not drastically change the dispersibility and thus can facilitate appropriately aggregating the large particles (organic particles).

A solvent having a high drying rate having a relative evaporation rate (relative evaporation rate when the evaporation rate of n-butyl acetate is taken as 100) of 100 or more is preferable. Further, the relative evaporation rate of the solvent having a low drying rate is preferably less than 100, more preferably 20 to 80, further preferably 30 to 60.

The mass ratio of the solvent having a high relative evaporation rate to the solvent having a low relative evaporation rate is preferably 30:70 to 95:5, more preferably 40:60 to 90:10, further preferably 50:50 to 85:15.

As examples of the relative evaporation rate, toluene has a relative evaporation rate of 195, methyl ethyl ketone (MEK) has a relative evaporation rate of 465, methyl isobutyl ketone (MIBK) has a relative evaporation rate of 118, and propylene glycol monomethyl ether acetate has a relative evaporation rate of 34.

In order to accelerate the drying of the anti-glare layer-coating solution, it is preferable to control the drying conditions when the anti-glare layer is formed.

The drying conditions can be controlled by the drying temperature and the wind speed in the dryer. Specifically, the drying temperature is preferably 30 to 120° C., and the drying wind speed is preferably 0.2 to 50 m/s. In order to control the surface shape of the anti-glare layer by drying, irradiation with ionizing radiation is suitably performed after drying.

The anti-glare layer-coating solution may contain a leveling agent. Examples of the leveling agent include silicone leveling agents and fluorine leveling agents.

However, if the surface shape of the anti-glare layer is excessively leveled, it may be difficult to satisfy conditions 1 to 3 and the like. Therefore, the amount of the leveling agent to be added is preferably 0.01 to 0.5 wt %, more preferably 0.05 to 0.2 wt %, in the total solid content in the anti-glare layer-coating solution.

<<Transparent Base Material>>

The transparent base material preferably has optical transparency, smoothness, and heat resistance, and excellent mechanical strength.

Examples of such a transparent base material include plastic films such as polyester, triacetyl cellulose (TAC), cellulose diacetate, cellulose acetate butyrate, polyamide, polyimide, polyethersulfone, polysulfone, polypropylene, polymethylpentene, polyvinyl chloride, polyvinyl acetal, polyether ketone, polymethylmethacrylate, polycarbonate, polyurethane and amorphous olefin (Cyclo-Olefin-Polymer: COP), and glass. Two or more plastic films may be bonded.

Among them, stretched, particularly, biaxially stretched polyesters (such as polyethylene terephthalate and polyethylene naphthalate) are preferable, in view of the mechanical strength and the dimensional stability. Further, TAC and acrylic are suitable in view of the optical transparency and the optical isotropy. Further, COP and polyester are suitable because of their excellent weather resistance. Further, plastic films with a retardation value of 3000 to 30000 nm and plastic films with a ¼ wavelength phase difference are suitable in that they can suppress color unevenness to be observed on a display screen when an image of a liquid crystal display is observed through polarized sunglasses.

The thickness of the transparent base material is preferably 5 to 300 µm, more preferably 30 to 200 µm.

In the case where a reduction in the thickness of the anti-glare film is desired, the upper limit of the thickness of the transparent base material is preferably 60 µm, more preferably 50 µm. Further, in the case where the transparent base material is a base material with low moisture permeability such as polyester, COP, and acrylic, the upper limit of the thickness of the transparent base material is preferably 40 µm, more preferably 20 µm, for reducing the thickness. Even in the case of a large screen, the upper limit of the thickness of the transparent base material of falling within such a range is suitable also in that distortion can be made less likely to occur. The thickness of the transparent base material can be measured with Digimatic standard outside micrometer (product number "MDC-25SX" available from MITUTOYO CORPORATION) or the like. The average of the values of the thickness of the transparent base material of measured at any ten points may be the aforementioned numerical value, and variations in thickness are preferably within a range of ±8% from the average, more preferably within a range of ±4% from the average, further preferably within a range of ±3% from the average (when the average of the thickness is 50 µm, each thickness preferably falls within the range of 46 to 54 µm, preferably within the range of 48 to 52 µm, further preferably within the range of 48.5 to 51.5 µW.

The surface of the transparent base material may be subjected to application of coating called anchor agents or primers in advance, other than physical treatments such as corona discharge treatment and oxidation treatment, for improving the adhesiveness.

<<Functional Layer>>

The anti-glare film may have functional layers such as an antireflection layer, an antifouling layer, and an antistatic layer.

The functional layers can be formed, for example, on the anti-glare layer. In the case of having the anti-glare layer on the transparent base material, the functional layer can be formed on the opposite side of the anti-glare layer of the transparent base material.

<Size, Shape, or the Like>

The anti-glare film may be in the form of a sheet or a roll.

Further, the size of a sheet is not specifically limited, but the maximum diameter is about 2 to 500 inches. The "maximum diameter" refers to the maximum length connecting any two points of the anti-glare film. For example, in the case where the anti-glare film is rectangular, the diagonal of the area is the maximum diameter. Further, in the case where the anti-glare film is circular, the diameter is the maximum diameter. The shape of the sheet is not specifically limited and may be a polygonal (triangular, quadrangular, pentagon, and the like) or circular shape, or a random irregular shape, for example.

The width and length of the roll are not specifically limited, but the width is generally 500 to 3000 mm, and the length is about 100 to 5000 m. The anti-glare film in the form of a roll can be cut into a sheet according to the size of an image display device or the like for use. When cutting, it is preferable to exclude the end of the roll where the physical properties are not stable.

[Method for Selecting Anti-Glare Film]

A method for selecting the anti-glare film comprising an anti-glare layer of the present invention comprises: determining, as a determination condition, whether or not the anti-glare layer has a 500-µm square area, as measured for surface roughness, satisfying condition 1 and condition 2 below, where the maximum peak height is defined as P, a plane having a height obtained by adding P/6 to the average height is defined as the first reference plane, the number of projections exceeding the first reference plane is defined as N1, a plane having a height obtained by adding P/3 to the average height is defined as the second reference plane, and the number of projections exceeding the second reference plane is defined as N2; and selecting the anti-glare layer satisfying the determination condition;

$P$ is 0.20 µm or more and 1.20 µm or less; and <condition 1>

$0.20 \leq N2/N1 \leq 0.45$. <condition 2>

The preferable embodiments of the conditions 1 and 2 as the determination condition are the same as those of the anti-glare film of the present invention described above.

Further, the method for selecting an anti-glare film of the present invention preferably includes the preferable embodiments of the anti-glare film of the present invention described above as the determination condition other than the conditions 1 and 2.

[Anti-Glare Article]

The anti-glare article of the present invention comprises the anti-glare film of the present invention described above arranged on a member such that the surface on the anti-glare layer side of the anti-glare film faces the front side of the anti-glare article.

The member is not specifically limited as long as it has a transparency. Examples thereof include plastic plates and glass plates.

[Touchscreen]

The touchscreen of the present invention comprises a transparent substrate on a surface thereof, wherein the transparent substrate is the anti-glare film of the present invention described above arranged so that the surface on the anti-glare layer side of the anti-glare film faces the front side.

Examples of the touchscreen include general-purpose touchscreens such as those of resistive film type, capacitance type, electromagnetic induction type, infrared type and ultrasonic type.

[Display Device]

The display device of the present invention comprises a display element and an anti-glare film arranged on the light-emitting surface side of the display element, wherein the anti-glare film is the anti-glare film of the present invention described above arranged so that the surface on the anti-glare layer side of the anti-glare film faces the opposite side of the display elements.

Examples of the display elements include liquid crystal display elements, EL display elements (such as organic EL display elements and inorganic EL display elements), and plasma display elements and further include LED display elements such as micro LED display elements.

Examples of the liquid crystal display elements include those of TN type, STN type, TSTN type, IPS type, VA type, multi-domain type, and OCB type. In-cell touchscreen liquid crystal elements that incorporate a touchscreen function into any of these types can also be mentioned.

The interval (gap) between the display elements and the anti-glare layer of the anti-glare film is not specifically limited, but the display device of the present invention can suppress glare regardless of the gap. For example, the display device of the present invention can suppress glare even if the gap is more than 0.7 mm. Further, it can suppress glare even if the gap is 2.5 mm, as will be described below in Examples.

EXAMPLES

Hereinafter, the present invention will be described further in detail by way of examples, but the present invention is not limited by these examples at all. Unless otherwise particularly described, "parts" and "%" are mass-based.

1. Measurement and Assessment 1-1. Haze and Total Light Transmittance

After visually confirming that there were no abnormalities such as dust or scratches, a sample A was prepared by cutting the anti-glare film of each of Examples and Comparative Examples into 10 cm×10 cm.

Using a haze meter (HM-150, available from MURAKAMI COLOR RESEARCH LABORATORY), the total haze (JIS K7136:2000) and the total light transmittance (JIS K7361-1:1997) of the sample A were measured. The measurement was performed at nine points (see FIG. 4) for each sample A.

Further, the uneven shape was eliminated to be flattened by attaching an 80-μm thick TAC film (TD80UL, available from FUJIFILM Corporation) to the surface on the anti-glare layer side of the sample A via a transparent pressure-sensitive adhesive (PD-S1, available from PANAC CO., LTD., with a thickness of 25 μm), thereby producing a sample B with no influence of the haze due to the surface shape. The haze of the sample B was measured, to determine the internal haze (Hi). The measurement was performed at nine points for each sample B. Then, the surface haze (Hs) was calculated by subtracting the internal haze from the total haze.

When measuring the haze and the total light transmittance, an atmosphere with a temperature of 23° C.±5° C. and a humidity of 50%±10% was used. Further, each sample was left standing for 10 minutes or more in an atmosphere with a temperature of 23° C.±5° C. and a humidity of 50%±10% before the start of the measurement. The light incident surface was the transparent base material side, and the measurement sample was placed so as to avoid fingerprints and wrinkles.

The average values of the nine points were taken as the surface haze (Hs), the internal haze (Hi), and the total light transmittance (Tt) of each of Examples and Comparative Examples.

1-2. Measurement of Surface Shape of Anti-Glare Film

After visually confirming that there were no abnormalities such as dust or scratches, the anti-glare film of each of Examples and Comparative Examples was cut into 10 cm×10 cm. A sample C was produced by attaching a glass plate (with a thickness of 2.0 mm) having a size of 10 cm in length×10 cm in width to the surface of the cut anti-glare film on the transparent base material side via an optical transparent pressure-sensitive adhesive (25-μm thick PD-S1, available from PANAC CO., LTD.).

Using a white interference microscope (New View 7300, available from Zygo Corporation), the sample C was set so as to be fixed to and in close contact with a measurement stage, and then the surface shape of anti-glare film was measured and analyzed under the following conditions. For the measurement, Microscope Application of MetroPro ver. 9.0.10 was used. For the analysis, Microscope Application and Advanced Texture Application of MetroPro ver. 8.3.2 were used. First, while the following conditions in Microscope Application and "Square" in "Mask Data" were selected, and "size" was set to 0.5 mm, almost the center of each measurement area was set as an analysis area, to analyze a 500 μm×500 μm area. On the "Surface Map" window, "Ra", "Peak", "PV", and "Rz" were displayed, and their values respectively corresponded to Sa, P, PV, and Sz. Thereafter, a "Save Data" button was displayed on the "Surface Map" window, and the data analyzed was saved through the button. Then, after the data saved above was read in Advanced Texture Application, and the following analysis conditions were set, N1, N2 and N3 were calculated, where "Peaks" analyzed when "Peak Lower Limit" was set to P/6 on the "Peaks/Valleys" window were defined as N1, those analyzed when set to P/3 were defined as N2, and those analyzed when set to P/2 were defined as N3.

The measurement and the analysis were performed at nine points (see FIG. 4) for each sample C. Of the measured values or the analyzed values at the nine points, those at the middle point are shown in Table 1 as representative examples. In each sample, the measured values or the analyzed values at the other eight points were equivalent (within ±10%) to the values at the middle point. Further, in the samples of Examples, the values at the other eight points also satisfied the conditions 1 to 3.

In the measurement, an atmosphere with a temperature of 23° C.±5° C. and a humidity of 50%±10% was used. Further, each sample C was left standing for 10 minutes or more in an atmosphere with a temperature of 23° C.±5° C. and a humidity of 50%±10% before the start of the measurement.

<Measurement Conditions>

Objective lens: 10× Mirau

[Measurement Controls]

Acquisition Mode: Scan

Camera Mode: 992×992, 48 Hz

Subtract Sys Err: Off

AGC: Off

Phase Res: High

Connection Order: Location

Discon Action: Filter

Min Mod (%): 7

Min Area Size: 7

Scan Direction: Downward

Image Zoom: ×1

Remove Fringes: Off

Number of Averages: 0

FDA Noise Threshold: 10

Scan Length: 10-um bipolar

Extended Scan Length: 1000 μm

FDA Res: High 2 G

Camera resolution (Interval per point): 1.092 μm

Measurement area: 1083 μm×1083 μm

<Analysis Conditions>

<<Microscope Application>>

Removed: None

Trim: 0

Data Fill: On

Data Fill Max: 100

Filter: HighPass

Filter Low Wavelen: 250 μm

FilterType: GaussSpline

Filter Trim: Off

Remove spikes: On

Spike Height (xRMS): 2.5

<<Advanced Texture Application>>

High FFT Filter: Off

Low FFT Filter: Off

Remove spikes: Off

Noise Filter Size: 0

Noise Filter Type: 2, available from Sigma-Aldrich Co. LLC.

Fill Data: Off

Trim: 0

Remove: Plane 1-3. Clarity of Transmitted Image

Using a mapping instrument (product name: ICM-1T), available from Suga Test Instruments Co., Ltd., the sample A produced in "1-1" above was measured for clarity of a transmitted image according to JIS K7374:2007. Each sample A was measured at nine points. The average value of the nine points was taken as the clarity of the transmitted image of each of Examples and Comparative Examples. In the measurement, an atmosphere with a temperature of 23° C.±5° C. and a humidity of 50%±10% was used. Further, each sample was left standing for 10 minutes or more in an atmosphere with a temperature of 23° C.±5° C. and a humidity of 50%±10% before the start of the measurement. The light incident surface was the anti-glare layer side, and the measurement sample was placed so as to avoid fingerprints and wrinkles.

1-4. Glare (Gap: About 0.8 mm)

The surface of the anti-glare film on the transparent base material 1 side was attached to the surface of a black matrix (with a glass thickness of 0.7 mm, a pixel density of the black matrix corresponding to 350 ppi) 300 on the side with no matrix formed via a transparent pressure-sensitive adhesive layer 200 (product number: PD-S1, 25-μm thick, available from PANAC CO., LTD.), so that stains such as wrinkles and fingerprints, dust, and air were eliminated as much as possible, to produce a sample D1 for glare evaluation. The sample D1 for glare evaluation can be regarded as having a gap between the display elements and the anti-glare layer of 0.805 mm (the glass thickness of the black matrix of 0.7 mm+the thickness of the transparent pressure-sensitive adhesive layer of 0.025 mm+the thickness of the transparent base material of 0.08 mm).

In a dark room, light was emitted with a white surface light source 500 (LIGHTBOX, with an average luminance of 1000 cd/m$^2$, available from HAKUBA PHOTO INDUSTRY CO., LTD.) from the black matrix side of the sample D1 for evaluation, to generate pseudo glare, and an image was captured from the anti-glare layer 2 side with a CCD camera 600 (KP-M1, C-mount adapter, close-up ring; PK-11A Nikon, camera lens; 50 mm, F1.4s NIKKOR). The distance between the white surface light source 500 and the black matrix 300 was set to 70 mm, the distance between the CCD camera 600 and the anti-glare layer 2 was set to 200 mm, and the focus of the CCD camera was adjusted onto the anti-glare film. FIG. 5 is a schematic view of the measurement above.

Using an image processing software (ImagePro Plus ver. 6.2; available from Media Cybernetics), the image captured by the CCD camera was imported into a personal computer through an image board (Pro-Series Capture Kit Spectrum Pro For Windows 2000 & XP Pro Version 5.1), to obtain image data consisting of collection of the luminance of each pixel. Further, the analysis was performed as follows using the same software. At the time of importing, the imported screen data displayed by Menu→Import→Video/Digital was set to have a luminance of 32, a contrast of 40, a hue of 32, a saturation of 32, and other items of the default settings.

First, evaluation points of 200×160 pixels (10 mm×8 mm on the sample) were selected from the imported image data, and the evaluation points were converted into a 16-bit gray scale.

Then, a low-pass filter was selected from the emphasis tabs of the filter commands, and the filter was applied under the conditions of "3×3, the number of times of 3, and a strength of 10". Thereby, the components derived from the black matrix pattern were removed.

Then, flattening was selected, and shading correction was performed under the condition of "background: dark and object width: 10".

Then, the contrast was enhanced by setting the contrast enhancement command to "contrast: 96 and brightness: 48". The image data obtained was converted into an 8-bit gray scale (256 gradation gray scale). In other words, the image data obtained was converted into a luminance of 256 gradations having a maximum value of 255 and a minimum value of 0 (no unit since it is a converted value). The standard deviation of the luminance of each pixel in an area of 150×110 pixels (=16500 pixels) was calculated for the image data thus obtained, and the value was taken as a glare value. The luminance of the light source was adjusted so that the luminance average in this area was 120 to 140.

1-5. Glare (Gap: About 1.9 mm and about 2.6 mm)

The glare value was calculated in the same manner as in 1-4 except that the sample D1 for glare evaluation was changed to the following sample D2 or D3 for glare evaluation. The sample D2 for glare evaluation can be regarded as having a gap between the display elements and the anti-glare layer of 1.905 mm (the glass thickness of the black matrix of 0.7 mm+the glass thickness of 1.1 mm+the thickness of the transparent pressure-sensitive adhesive layer of 0.025 mm+the thickness of the transparent base material of 0.08 mm). Further, the sample D3 for glare evaluation can be regarded as having a gap between the display elements and the anti-glare layer of 2.605 mm (the glass thickness of the black matrix of 0.7 mm+the glass thickness of 1.8 mm+the thickness of the transparent pressure-sensitive adhesive layer of 0.025 mm+the thickness of the transparent base material of 0.08 mm). In the following samples D2 and D3 for glare evaluation, the black matrix 300 and the glass were laminated by fixing the ends with a tape in the state where both members were stacked.

<Sample D2 for Glare Evaluation>

The sample D1 for glare evaluation with a 1.1-mm thick glass arranged between the black matrix 300 and the transparent pressure-sensitive adhesive layer 200.

<Sample D3 for Glare Evaluation>

The sample D1 for glare evaluation with a 1.8-mm thick glass arranged between the black matrix 300 and the transparent pressure-sensitive adhesive layer 200.

1-6. Anti-Glare Property

A black acrylic plate was attached onto the transparent base material side of the anti-glare film via a transparent pressure-sensitive adhesive, so that stains such as wrinkles and fingerprints, dust, and air were eliminated as much as possible, to produce a sample for evaluating the anti-glare property. The sample was visually observed by 15 subjects in a bright room environment (environment in which the illuminance on the anti-glare film was 800 to 1200 Lx) and evaluated for whether or not to have an anti-glare property so that the reflection of an observer and the background of the observer was not a concern based on the following criteria.

A: 10 or more people answered good
B: 5 to 9 people answered good
C: 4 or less people answered good 2. Production of Anti-Glare Film Example 1

An anti-glare film of Example 1 was obtained by applying an anti-glare layer-coating solution 1 formulated as follows onto a transparent base material (TD80UL, an 80-μm thick triacetyl cellulose resin film (TAC), available from FUJIFILM Corporation), followed by drying at 70° C. and a wind speed of 5 m/s for 30 seconds and then irradiation with ultraviolet rays in a nitrogen atmosphere (with an oxygen concentration of 200 ppm or less) to an integrated light intensity of 100 mJ/cm$^2$, to form an anti-glare layer. The film thickness of the anti-glare layer was 3.0 μm. The Sa on the opposite side of the anti-glare layer of the anti-glare film was 0.012 μm.

<Anti-Glare Layer-Coating Solution 1>
Pentaerythritol triacrylate: 20 parts
(KAYARAD-PET-30, available from Nippon Kayaku Co., Ltd.)
Isocyanuric acid EO-modified triacrylate: 25 parts
(M-313, available from TOAGOSEI CO., LTD.)
Acrylic polymer: 12 parts
(Molecular weight: 75,000, available from Mitsubishi Rayon Co., Ltd.)
Photopolymerization initiator: 3 parts
(Omnirad 184, available from IGM Resins B.V.)
Silicone leveling agent: 0.12 parts
(TSF 4460, available from Momentive Performance Materials Inc.)
Translucent particles: 5 parts
(Spherical polyacrylic-styrene copolymer, available from Sekisui Kasei Co., Ltd.)
(Average particle size: 2.0 μm, refractive index: 1.515)
(Proportion of particles having a particle size of 1.8 to 2.2 μm: 90% or more)
Inorganic fine particle dispersion: 155 parts
(Silica having a surface with a reactive functional group introduced therein, available from Nissan Chemical Corporation, solvent MIBK, solid content 35%)
(Average particle size: 12 nm)
Solvent 1: 75 parts
(Toluene)
Solvent 2: 50 parts
(Propylene glycol monomethyl ether acetate)

Example 2

An anti-glare film of Example 2 was obtained in the same manner as in Example 1, except that the anti-glare layer-coating solution 1 was changed to an anti-glare layer-coating solution 2 formulated as follows, and it was applied to a film thickness of the anti-glare layer of 5.0 μm.
<Anti-Glare Layer-Coating Solution 2>
Pentaerythritol triacrylate: 33 parts
(KAYARAD-PET-30, available from Nippon Kayaku Co., Ltd.)
Isocyanuric acid EO-modified triacrylate: 25 parts
(M-313, available from TOAGOSEI CO., LTD.)
Acrylic polymer: 12 parts
(Molecular weight: 75,000, available from Mitsubishi Rayon Co., Ltd.)
Photopolymerization initiator: 3 parts
(Omnirad 184, available from IGM Resins B.V.)
Silicone leveling agent: 0.12 parts
(TSF 4460, available from Momentive Performance Materials Inc.)
Translucent particles: 5 parts
(Spherical polyacrylic-styrene copolymer, available from Sekisui Kasei Co., Ltd.)
(Average particle size: 3.5 μm, refractive index: 1.525)
(Proportion of particles having a particle size of 3.2 to 3.8 μm: 90% or more)
Inorganic fine particle dispersion: 120 parts
(Silica having a surface with a reactive functional group introduced therein, available from Nissan Chemical Corporation, solvent MIBK, solid content 35%)
(Average particle size: 12 nm)
Solvent 1: 90 parts
(Toluene)
Solvent 2: 55 parts
(Propylene glycol monomethyl ether acetate)

Example 3

An anti-glare film of Example 3 was obtained in the same manner as in Example 1, except that the anti-glare layer-coating solution 1 was changed to an anti-glare layer-coating solution 3 formulated as follows.
<Anti-glare layer-coating solution 3>
Pentaerythritol triacrylate: 30 parts
(KAYARAD-PET-30, available from Nippon Kayaku Co., Ltd.)
Isocyanuric acid EO-modified triacrylate: 25 parts
(M-313, available from TOAGOSEI CO., LTD.)
Acrylic polymer: 12 parts
(Molecular weight: 75,000, available from Mitsubishi Rayon Co., Ltd.)
Photopolymerization initiator: 3 parts
(Omnirad 184, available from IGM Resins B.V.)
Silicone leveling agent: 0.12 parts
(TSF 4460, available from Momentive Performance Materials Inc.)
Translucent particles: 5 parts
(Spherical polyacrylic-styrene copolymer, available from Sekisui Kasei Co., Ltd.)
(Average particle size: 2.0 μm, refractive index: 1.515)
(Proportion of particles having a particle size of 1.8 to 2.2 μm: 90% or more)
Inorganic fine particle dispersion: 130 parts
(Silica having a surface with a reactive functional group introduced therein, available from Nissan Chemical Corporation, solvent MIBK, solid content 35%)
(Average particle size: 12 nm)
Solvent 1: 85 parts
(Toluene)
Solvent 2: 55 parts
(Propylene glycol monomethyl ether acetate)

Comparative Example 1

An anti-glare film of Comparative Example 1 was obtained in the same manner as in Example 2, except that the anti-glare layer-coating solution 2 was changed to an anti-glare layer-coating solution 4 formulated as follows.
<Anti-glare layer-coating solution 4>
Pentaerythritol triacrylate: 40 parts
(KAYARAD-PET-30, available from Nippon Kayaku Co., Ltd.)
Urethane acrylate: 60 parts
(V-4000BA, available from DIC Corporation)
Photopolymerization initiator: 3 parts
(Omnirad 184, available from IGM Resins B.V.)
Silicone leveling agent: 0.12 parts
(TSF 4460, available from Momentive Performance Materials Inc.)
Translucent particles: 11 parts
(Spherical polystyrene polymer, available from Sekisui Kasei Co., Ltd.)
(Average particle size: 3.0 μm, refractive index: 1.595)
(Proportion of particles having a particle size of 2.7 to 3.3 μm: 90% or more)
Solvent 1: 100 parts
(Toluene)
Solvent 2: 66 parts
(Propylene glycol monomethyl ether acetate)

Comparative Example 2

An anti-glare film of Comparative Example 2 was obtained in the same manner as in Example 2, except that the anti-glare layer-coating solution 2 was changed to an anti-glare layer-coating solution 5 formulated as follows.

<Anti-glare layer-coating solution 5>
Pentaerythritol tetraacrylate: 50 parts
(PETA, available from DAICEL-CYTEC COMPANY, LTD.)
Urethane acrylate: 50 parts
(V-4000BA, available from DIC Corporation)
Photopolymerization initiator: 3 parts
(Omnirad 184, available from IGM Resins B.V.)
Silicone leveling agent: 0.12 parts
(TSF 4460, available from Momentive Performance Materials Inc.)
Translucent particles: 4 parts
(Spherical polystyrene polymer, available from Sekisui Kasei Co., Ltd.)
(Average particle size: 2.0 μm, refractive index: 1.595)
(Proportion of particles having a particle size of 1.8 to 2.2 μm: 90% or more)
Silica fine particles: 0.5 parts
(Octyl silane-treated fumed silica, average primary particle size: 12 nm, available from Japan Aerosil Inc.)

Photopolymerization initiator: 3 parts
(Omnirad 184, available from IGM Resins B.V.)
Silicone leveling agent: 0.12 parts
(TSF 4460, available from Momentive Performance Materials Inc.)
Translucent particles: 3 parts
(Spherical polystyrene polymer, available from Sekisui Kasei Co., Ltd.)
(Average particle size: 2.0 μm, refractive index: 1.595)
(Proportion of particles having a particle size of 1.8 to 2.2 μm: 90% or more)
Silica fine particles: 1 part
(Octyl silane-treated fumed silica, average primary particle size: 12 nm, available from Japan Aerosil Inc.)
Solvent 1: 120 parts
(Toluene)
Solvent 2: 15 parts
(Propylene glycol monomethyl ether acetate)
Solvent 3: 30 parts
(Isopropyl alcohol)

TABLE 1

| | | Example 1 | Example 2 | Example 3 | Comparative Example 1 | Comparative Example 2 | Comparative Example 3 |
|---|---|---|---|---|---|---|---|
| Total light transmittance (%) | | 92.0 | 91.8 | 91.9 | 91.3 | 91.9 | 92.0 |
| Internal haze (%) | | 0.9 | 4.1 | 0.9 | 21.0 | 7.3 | 2.0 |
| Surface haze (%) | | 3.3 | 3.4 | 3.1 | 5.3 | 0.2 | 0.7 |
| Clarity of transmitted image (%) | $C_{0.125}$ | 92.0 | 84.9 | 90.0 | 41.5 | 68.0 | 62.4 |
| | $C_{0.25}$ | 92.1 | 84.8 | 90.4 | 40.4 | 68.5 | 63.7 |
| | $C_{0.5}$ | 92.1 | 85.1 | 91.2 | 44.4 | 76.0 | 71.1 |
| | $C_{1.0}$ | 93.5 | 86.0 | 91.3 | 50.9 | 85.0 | 82.3 |
| | $C_{2.0}$ | 93.4 | 87.6 | 93.2 | 62.7 | 90.4 | 91.9 |
| | Total | 463 | 428 | 456 | 240 | 388 | 371 |
| | $C_{2.0}-C_{0.125}$ | 1.4 | 2.7 | 3.2 | 21.2 | 22.4 | 29.5 |
| Surface roughness | Sa (um) | 0.039 | 0.044 | 0.031 | 0.079 | 0.030 | 0.053 |
| | Sz (um) | 0.67 | 0.66 | 0.61 | 1.09 | 0.21 | 0.30 |
| | Sz/Sa | 17.2 | 15.0 | 19.7 | 13.8 | 7.0 | 5.7 |
| | PV (um) | 0.85 | 0.78 | 0.77 | 1.41 | 0.29 | 0.45 |
| | P(um) | 0.72 | 0.68 | 0.62 | 1.04 | 0.20 | 0.30 |
| | N1 (number) | 610 | 371 | 507 | 340 | 113 | 80 |
| | N2 (number) | 208 | 92 | 215 | 224 | 59 | 84 |
| | N3 (number) | 46 | 26 | 54 | 54 | 49 | 41 |
| | N2/N1 | 0.34 | 0.25 | 0.42 | 0.66 | 0.52 | 1.05 |
| | N3/N2 | 0.22 | 0.28 | 0.25 | 0.24 | 0.83 | 0.49 |
| | Anti-glare property | A | A | A | A | A | A |
| Glare | Gap: about 0.8 mm | 10.7 | 13.5 | 10.6 | 15.9 | 13.4 | 13.0 |
| | Gap: about 1.9 mm | 9.3 | 12.6 | 11.9 | 12.1 | 15.3 | 17.9 |
| | Gap: about 2.6 mm | 9.1 | 13.4 | 12.9 | 11.1 | 18.0 | 23.0 |

Solvent 1: 110 parts
(Toluene)
Solvent 2: 50 parts
(Propylene glycol monomethyl ether acetate)
Solvent 3: 10 parts
(Isopropyl alcohol)

Comparative Example 3

An anti-glare film of Comparative Example 3 was obtained in the same manner as in Example 2, except that the anti-glare layer-coating solution 2 was changed to an anti-glare layer-coating solution 6 formulated as follows.
<Anti-glare layer-coating solution 6>
Pentaerythritol tetraacrylate: 50 parts
(PETA, available from DAICEL-CYTEC COMPANY, LTD.)
Urethane acrylate: 50 parts
(V-4000BA, available from DIC Corporation)

As is obvious from the results of Table 1, the glare values were suppressed to low values of 14.0 or less with any gap, and variations in numerical values were also suppressed, in the anti-glare films of Examples. In contrast, the anti-glare films of Comparative Examples had significant variations in glare values due to the gap variations. That is, it can be confirmed that the anti-glare films of Examples can stably suppress glare regardless of the gap between the display elements and the anti-glare layer while having an anti-glare property.

REFERENCE SIGNS LIST

1: Transparent base material
2: Anti-glare layer
10: Anti-glare film
200: Transparent pressure-sensitive adhesive layer
300: Black matrix
500: White surface light source 600: CCD camera
700: Support
800: Horizontal table

The invention claimed is:

1. An anti-glare film comprising an anti-glare layer, wherein
the anti-glare layer has a 500-μm square area, as measured for surface roughness, satisfying condition 1 and condition 2 below, where the maximum peak height is defined as P, a plane having a height obtained by adding P/6 to the average height is defined as a first reference plane, the number of projections exceeding the first reference plane is defined as N1, a plane having a height obtained by adding P/3 to the average height is defined as a second reference plane, and the number of projections exceeding the second reference plane is defined as N2:

$P$ is 0.20 μm or more and 1.20 μm or less; and <condition 1>

$0.20 \leq N2/N1 \leq 0.45$. <condition 2>.

2. The anti-glare film according to claim 1, wherein
the 500-μm square area satisfying condition 1 and condition 2 further satisfies condition 3 below, where a plane having a height obtained by adding P/2 to the average height is defined as a third reference plane, and the number of projections exceeding the third reference plane is defined as N3:

$0.20 \leq N3/N2 \leq 0.45$. <condition 3>

3. The anti-glare film according to claim 1, wherein
the 500-μm square area satisfying condition 1 and condition 2 has a maximum height roughness PV of more than 0.60 μm and 1.50 μm or less.

4. The anti-glare film according to claim 1, wherein
the 500-μm square area satisfying condition 1 and condition 2 has an arithmetic average roughness Sa of 0.020 μm or more and 0.070 μm or less.

5. The anti-glare film according to claim 1, having an internal haze of 6.0% or less.

6. The anti-glare film according to claim 1, wherein
the sum of clarities of transmitted images $C_{0.125}$, $C_{0.25}$, $C_{0.5}$, $C_{1.0}$ and $C_{2.0}$, as measured for each of optical combs having widths of 0.125 mm, 0.25 mm, 0.5 mm, 1.0 mm and 2.0 mm according to JIS K7374:2007, is 380% or more, where the clarity of the transmitted image of the optical comb having a width of 0.125 mm is defined as $C_{0.125}$, the clarity of the transmitted image of the optical comb having a width of 0.25 mm is defined as $C_{0.25}$, the clarity of the transmitted image of the optical comb having a width of 0.5 mm is defined as $C_{0.5}$, the clarity of the transmitted image of the optical comb having a width of 1.0 mm is defined as $C_{1.0}$, and the clarity of the transmitted image of the optical comb having a width of 2.0 mm is defined as $C_{2.0}$.

7. An anti-glare article comprising the anti-glare film according to claim 1 arranged on a member such that the surface on the anti-glare layer side of the anti-glare film faces the front side of the anti-glare article.

8. A touchscreen comprising a transparent substrate on its front surface, wherein
the transparent substrate is the anti-glare film according to claim 1 arranged so that the surface on the anti-glare layer side of the anti-glare film faces a user's side.

9. A display device comprising:
a display element; and
an anti-glare film arranged on the light-emitting surface side of the display element, wherein
the anti-glare film is the anti-glare film according to claim 1 arranged so that the surface on the anti-glare layer side of the anti-glare film faces a direction opposite the display element.

10. A method for selecting an anti-glare film comprising an anti-glare layer, the method comprising:
determining, as a determination condition, whether or not the anti-glare layer has a 500-μm square area, as measured for surface roughness, satisfying condition 1 and condition 2 below, where the maximum peak height is defined as P, a plane having a height obtained by adding P/6 to the average height is defined as a first reference plane, the number of projections exceeding the first reference plane is defined as N1, a plane having a height obtained by adding P/3 to the average height is defined as a second reference plane, and the number of projections exceeding the second reference plane is defined as N2; and
selecting the anti-glare layer satisfying the determination condition:

$P$ is 0.20 μm or more and 1.20 μm or less; and <condition 1>

$0.20 \leq N2/N1 \leq 0.45$. <condition 2>.

* * * * *